United States Patent [19]

Ek

[11] Patent Number: 4,713,146

[45] Date of Patent: Dec. 15, 1987

[54] DRIVE SHAFT ASSEMBLY

[75] Inventor: Matthew C. Ek, Chico, Calif.

[73] Assignee: Rockwell International Corporation, El Segundo, Calif.

[21] Appl. No.: 691,087

[22] Filed: Jan. 14, 1985

[51] Int. Cl.⁴ .............................................. B01D 1/18
[52] U.S. Cl. .................................. 159/4.2; 159/4.01; 159/4.07; 384/535
[58] Field of Search ..................... 159/4.01, 4.02, 4.07, 159/4.2; 55/230; 384/535

[56] References Cited

U.S. PATENT DOCUMENTS

| | | | |
|---|---|---|---|
| 1,908,743 | 5/1933 | Farrell | 384/535 |
| 2,473,035 | 6/1949 | Meade et al. | 159/4.2 X |
| 2,661,984 | 12/1953 | Peebles et al. | 159/4.2 X |
| 2,747,659 | 5/1956 | Delruelle | 159/4.01 |
| 2,872,973 | 2/1959 | Nieuwenhuis et al. | 159/4.02 |
| 2,912,172 | 11/1959 | Moller | 159/4.2 X |
| 3,467,451 | 9/1969 | Marley | 384/535 X |
| 4,052,255 | 10/1977 | Hackbarth et al. | 159/4.01 |
| 4,553,855 | 11/1985 | De Choudhury | 384/535 X |
| 4,573,809 | 3/1986 | Jacob | 384/535 X |

Primary Examiner—Kathleen J. Prunner

Attorney, Agent, or Firm—H. Fredrick Hamann; Harry B. Field; Clark E. DeLarvin

[57] ABSTRACT

A drive shaft comprising an elongated inner drive shaft having an end connected to a drive device and an opposite end engaged with a work piece. A hollow outer shaft extends circumferentially about and coaxially with the drive shaft in a spaced-apart relationship thereto, and is connected to the drive shaft. A bearing carrier member extends circumferentially about and coaxially with the outer shaft. First and second springs inhibit movement of the outer shaft and the bearing carrier member respectively. A bearing is located intermediate the bearing carrier member and outer shaft. The assembly further includes a support structure provided with a bore which circumferentially surrounds the bearing carrier member and second springs. An outer surface of the bearing carrier member and an inner surface of the bore cooperatively form a fluid passageway which is bounded on either side by barriers which form restricted fluid flow paths. A pressurized flow of a fluid to the passageway and across each barrier forms a squeeze film damper to resist lateral movement of the bearing carrier member.

22 Claims, 8 Drawing Figures

DRIVE SHAFT ASSEMBLY

BACKGROUND OF THE INVENTION

1. Field of the Invention

The present invention relates to a drive shaft assembly for use in a machine which drives a rotating work piece at an operating speed above the critical speed with rotating parts. It particularly relates to a drive shaft assembly having flexibility for permitting the work piece to rotate about its center of mass under conditions of imbalance.

It has been recognized for some time that rotating machinery should be well balanced since any unbalance would result in undue vibration which in turn has a deleterious effect on the bearings and journals. For example, in U.S. Pat. No. 2,344,753 there is disclosed a balancing machine for propeller shafts. The machine utilizes a cantilever bearing for supporting the part to be balanced. The bearing is mounted in an inertia member damped by suitable springs such that the cantilever bearing can vibrate independently of the inertia member and such independent movement is transmitted to an indicating device. It is taught that such an arrangement provides a natural frequency for the bearing and inertia member which is out of the range of the frequency of the vibration produced by any unbalance in the propeller shaft.

It also has been proposed to accommodate radial deflections which occur from imbalance through the use of a flexible bearing support. U.S. Pat. No. 3,388,880 describes a flexible bearing support designed such that the deflections of the supporting means cannot be transferred to the bearing itself. Rather, the bearing support has a flexible web portion which is adapted to be deformed to compensate for such deflection.

U.S. Pat. No. 4,129,343 describes a unitary self-aligning bearing assembly of a ball and socket type in which the outer radial bearing ring has at least one radial end face carrying a bearing race with an axial thrust bearing mounted thereon.

As higher rotational speeds are utilized, for example in turbines and compressors, the operational speeds frequently are above the critical speed of the rotating parts. Thus in U.S. Pat. No. 4,324,440 there is described a containing bearing for use with rotors operating above their critical speed. There is provided a gap between the containing bearing and the rotor. The gap is equal to or larger than the maximum amplitude of vibration of the rotor in normal operation. The containing bearing is supported by a resilient sleeve which is fixed to prevent its rotation.

The problem of imbalance is particularly acute in spray dryers which utilize an atomizer disc. The performance of a spray dryer used in a flue gas cleaning system can be optimized by use of an atomizer disc to produce droplets of a scrubbing solution or slurry which are correctly sized for both ballistic and chemical reaction requirements. This is achieved by rotating a disc or wheel, similar to a centrifugal pump, at high speeds so the liquid is shattered when injected into the relatively stationary gas.

One of the major problems occurring during operation of such a device is the onset of mechanical vibration caused by unbalance of the atomizer disc. This unbalance is usually the result of uneven buildup (or removal) of scrubbing solution products in or on the surfaces of the disc. Buildup on the disc is normally a gradual process and does not necessarily result in unbalance, while the loss of such buildup from centrifugal forces is normally a step function. Erosion of the wheel, if such occurs, is very slow and can normally be detected. Loss of wear-resistant material (normally ceramics) by fracture and expulsion will also produce a step function unbalanced condition. Any unbalance will produce reactive loads on the atomizer drive shaft and support bearings which will lead to either a very rapid failure or drastic reduction in the life of these components. Clearly, there is a need for a drive shaft assembly which could operate continuously and accommodate a reasonable amount of unbalance at high rotational speeds of, for example, 10,000–30,000 rpm.

SUMMARY OF INVENTION

The present invention provides a drive shaft assembly for use in a machine which includes a drive means for imparting torque at a high rotational speed to a work piece which is subject to variable imbalance conditions during normal operation of the machine. The drive shaft assembly is particularly well suited for use in applications wherein the work piece is driven at super critical rotational speeds, for example, from 10,000–30,000 rpm. It is specifically intended for use in applications wherein the end of the drive shaft assembly which supports the work piece is laterally unsupported. Thus, the drive shaft assembly of the present invention is uniquely suited for use in, for example, a spray dryer to interconnect a drive means and a high speed rotating atomizing disc.

Broadly, the drive shaft assembly comprises an elongated inner drive shaft having opposite ends. One of the ends is provided with engagement means for connection to a drive means to receive torque therefrom. The opposite end of the drive shaft is cooperatively engaged with a work piece for transmitting torque thereto. A substantially cylindrical hollow outer shaft circumferentially surrounds the drive shaft and extends coaxially therewith. The outer shaft has an inner surface spaced apart from an outer surface of the drive shaft. The outer shaft is connected to the drive shaft, preferably adjacent the engagement means. The assembly further includes a first spring means for resiliently inhibiting movement of the outer shaft from its coaxial position with the drive shaft. A bearing carrier member is provided which circumferentially surrounds and extends coaxially with the outer shaft in a spaced-apart relationship thereto. A bearing means is located circumferentially about the outer surface of the outer shaft for permitting rotational movement of the outer shaft. The bearing means is retained in position by an inner surface of the bearing carrier member and the outer surface of the outer shaft. Lubrication means also is provided for maintaining a flow of lubricant to the bearing means during normal operation of the machine. A second spring means is provided for resiliently inhibiting movement of the bearing carrier member from its coaxial position with the outer shaft. A support structure is provided to support the drive means. The support structure includes a bore defined by an inner surface which circumferentially surrounds the bearing carrier and second spring means. The bore in the support structure extends substantially coaxially with both of the shafts and the bearing carrier member. The outer surface of the bearing carrier member and the inner surface of the bore cooperatively form an annular fluid flow passageway which is bounded axially on either side by annular axially extending barriers. Each barrier forms a restricted fluid flow path. A pump means is provided for producing a pressurized flow of a viscous fluid to the annular fluid flow passageway during normal operation of the machine such that the fluid will flow axially across each barrier to form a squeeze film dampener to resist lateral movement of the bearing carrier member.

BRIEF DESCRIPTION OF THE DRAWINGS

FIG. 7 is a schematic illustration of the mathematical nomenclature describing the unbalanced work piece (rotating disc); and FIG. 8 is a schematic illustration of the mathematical nomenclature describing the bearing.

DESCRIPTION OF THE PREFERRED EMBODIMENT

Figure 1:
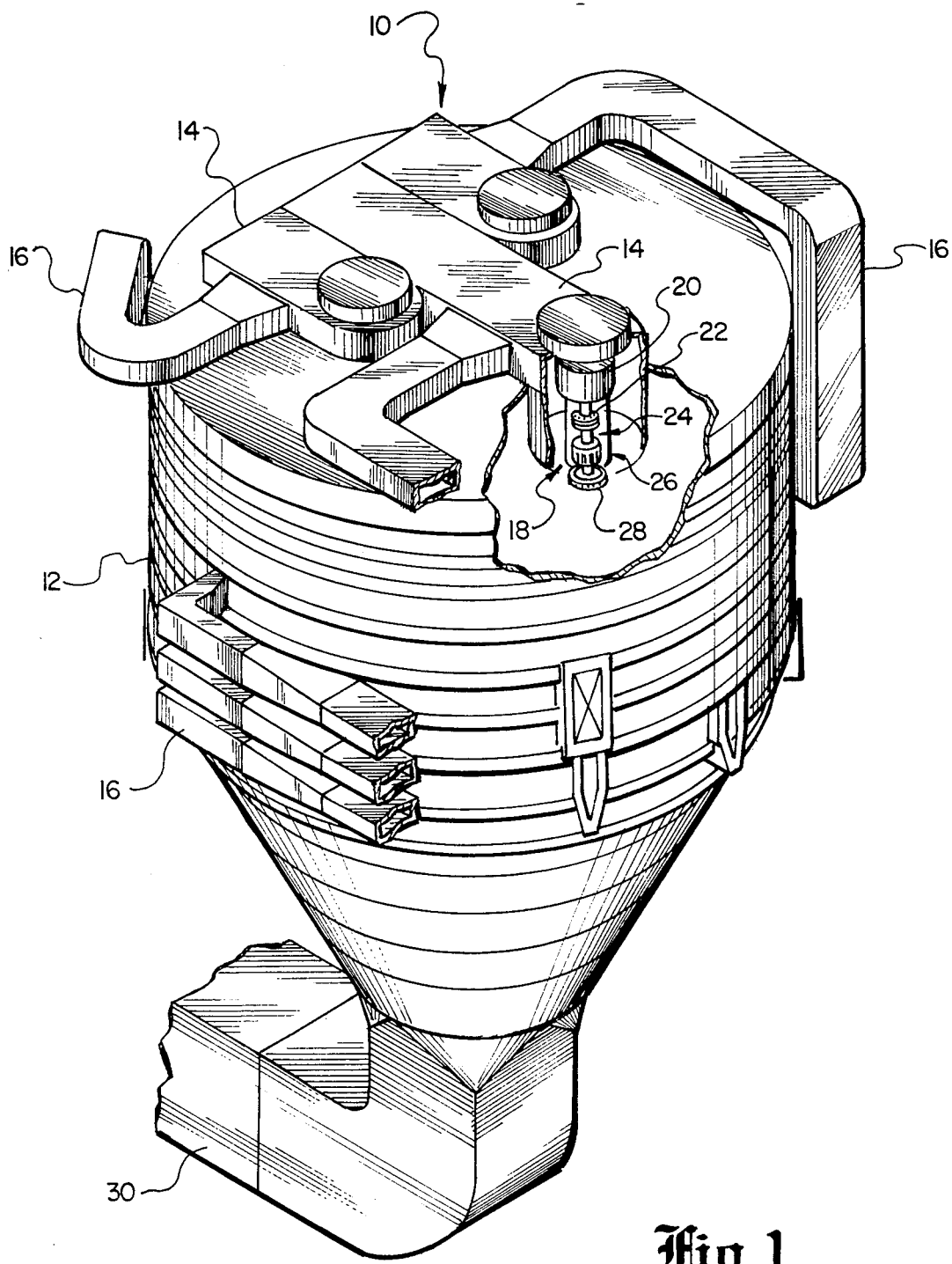
FIG. 1 is a perspective view, partially broken away, of a spray dryer incorporating the drive shaft assembly of the present invention.

Referring now to the drawings wherein like reference characters designate corresponding parts throughout the several views, FIG. 1 illustrates a particularly preferred application of the present invention. Depicted therein is a spray dryer assembly 10 such as is typically used for the treatment of a hot gas stream containing gaseous impurities which are to be scrubbed therefrom. Spray dryer assembly 10 includes a housing 12, the interior of which defines a treatment zone. Ducts 14 are provided for the introduction of the hot gas to be treated into the treatment zone. Advantageously, as taught in copending application Ser. No. 06/497,617 filed May 24 1983, and assigned to the assignee of the subject invention, the spray dryer assembly also includes plurality of bypass ducts 16 for introducing a portion of the hot gas into the treatment zone about the periphery of housing 12. The hot gas enters spray dryer assembly 10 through ducts 14 circumferentially about a spray machine 18. Spray machine 18 includes a drive means 20 which may be a direct drive high speed motor or a combination of a motor and transmission. In either event, drive means 20 is provided with an output shaft 22 for connection to the drive shaft assembly 24 of the present invention which includes a housing 26 shown in phantom and an atomizer disc 28. Atomizer disc 28 is provided with a fluid inlet, not shown, for receiving and dispersing an aqueous slurry or solution of a scrubbing medium. Typically, when the gaseous impurity to be removed from the flue gas is sulfur dioxide, the scrubbing medium will comprise an oxide, hydroxide or carbonate of sodium or calcium. Atomizer disc 28 is driven at high rotational speeds typically on the order of from about 10,000–30,000 rpm. The hot gas and reaction products of the gaseous impurity and scrubbing medium are discharged through an outlet duct 30 located adjacent a bottom portion of housing 12.

Figure 2:
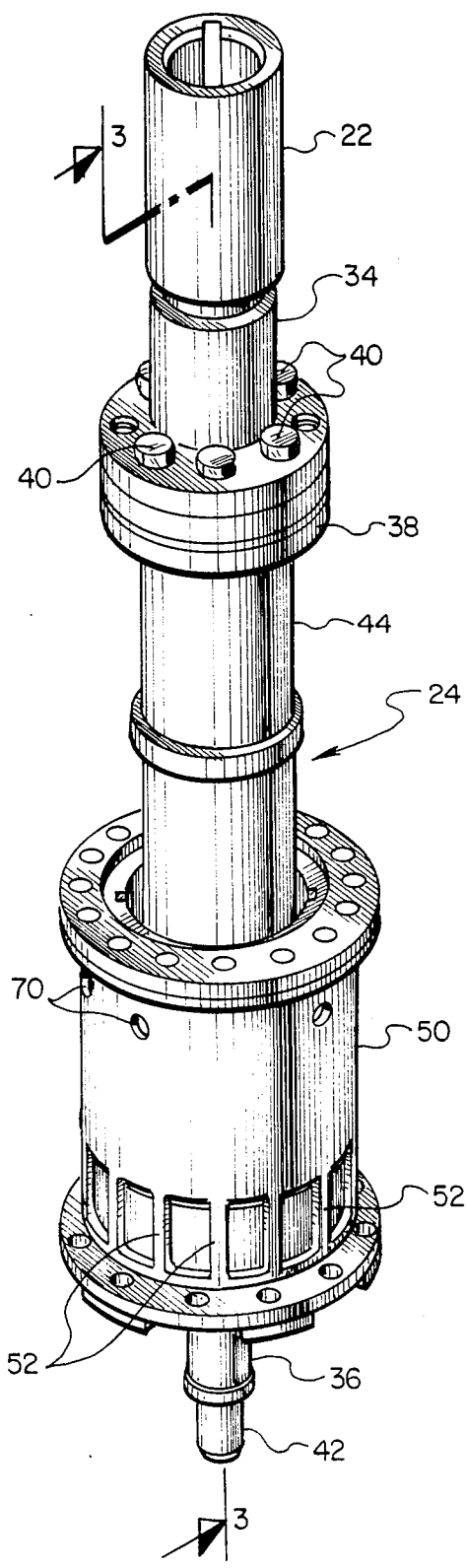
FIG. 2 is an enlarged perspective view of the drive shaft assembly excluding the housing for clarity.
Figure 3:
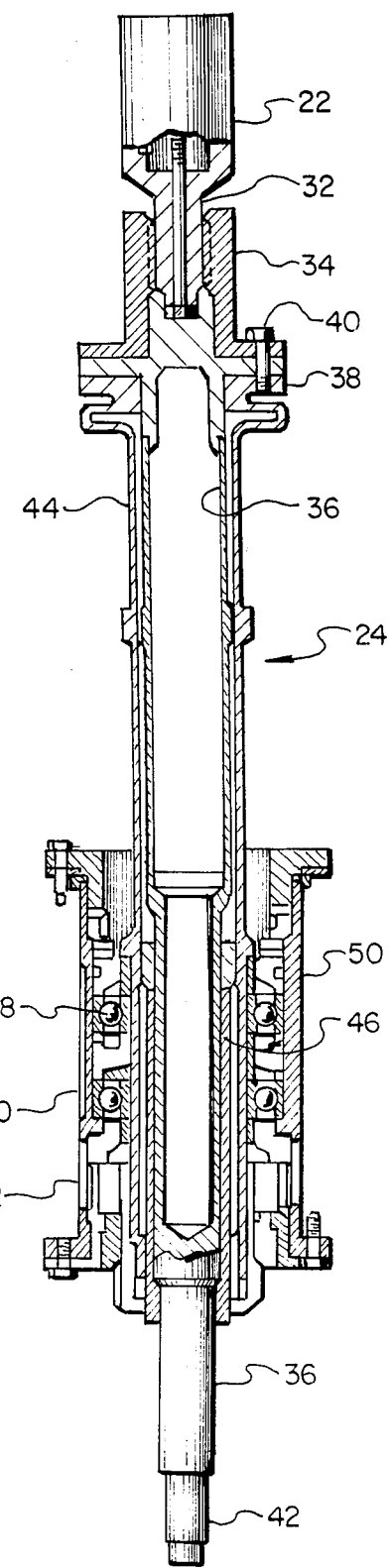
FIG. 3 is a cross-sectional view of FIG. 2 taken along line 3—3.

Referring now to FIGS. 2 and 3 therein is shown an enlarged view of drive shaft assembly 24 with housing 26 and atomizer disc 28 removed for clarity. It is seen that output shaft 22 terminates at its lower end in a male spline 32 which is engaged with a female spline 34. Female spline 34 is interconnected to an inner drive shaft 36 via a flange fitting 38 and fasteners 40. The lower end of inner drive shaft 36 is provided with an attachment means 42 for interconnecting inner drive shaft 36 and atomizer disc 28. Inner drive shaft 36 is circumferentially surrounded by a hollow outer shaft 44 which extends coaxially with inner drive shaft 36. Outer shaft 44 is interconnected with inner drive shaft 36 via flange member 38. Intermediate outer shaft 44 and inner drive shaft 36 there is provided a spring means 46. Located circumferentially about the outer surface of outer shaft 44 are a pair of axially spaced-apart bearing means 48. Bearing means 48 are retained in place by a bearing carrier member 50. The lower portion of bearing carrier member 50 has a plurality of axially extending slots cut through it about its periphery, such that the material left between the slots forms a plurality of axially extending cantilever spring members 52.

Figure 4:
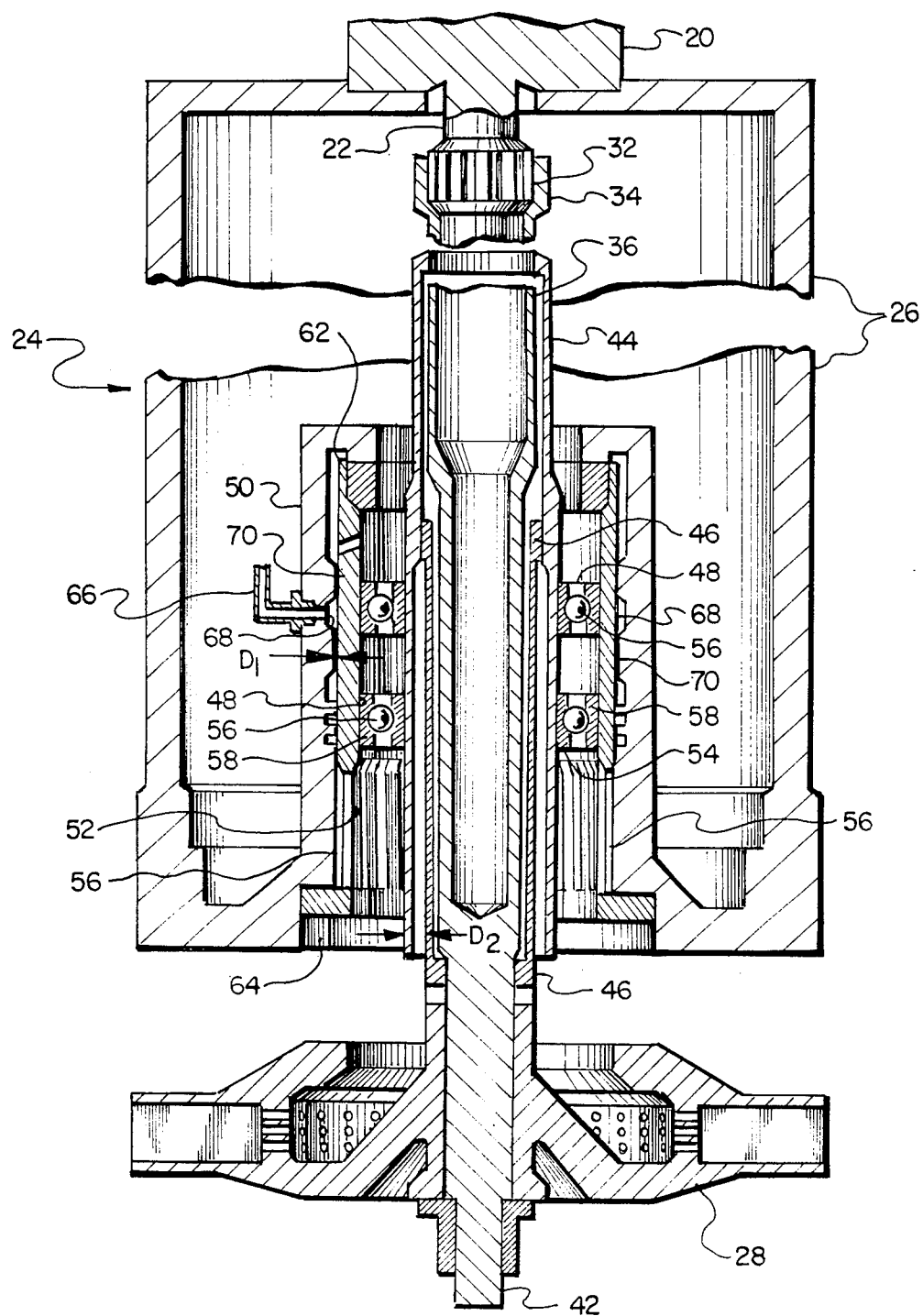
FIG. 4 is an enlarged schematic of the cross-sectional view of the drive shaft assembly shown in FIG. 3, but simplified to more clearly illustrate certain parts.

The key aspects of the present invention will be more clear with reference to FIG. 4 which is a cross-sectional schematic illustration of the key features of the drive shaft assembly of the present invention (non-material parts having been eliminated for clarity). One of the key aspects of the present invention is the manner in which drive means 20 is interconnected with inner drive shaft 36. As depicted, drive means 20 is provided with an output shaft 22 terminating in a spline member (male) in mating engagement with another spline member (female) 34. It is an essential feature of the present invention that the means for receiving the torque from drive means 20 and transmitting it to inner drive shaft 36 provide for some flexible or pivotal movement. Thus, for drive shaft 36 to have some flexibility, it must be provided with some means for pivotal motion to prevent bending moments from being transferred from inner drive shaft 36 to drive means 20 during normal operation.

Inner drive shaft 36 is circumferentially surrounded by a substantially cylindrical, hollow outer shaft 44 which extends coaxially in a spaced-apart relationship with inner drive shaft 36. An inner surface of outer shaft 44 and an outer surface of drive shaft 36 define an annular space in which there is located a first spring means 46 for resiliently inhibiting movement between inner shaft 36 and outer shaft 44. Spring means 46 is substantially cylindrical in shape and includes a plurality of axially extending elements, each of said elements forming a cantilever spring substantially identical in configuration to elements 52 of bearing carrier member 50 (see FIG. 2). There is provided an annular space between spring means 46 and the inner surface of outer shaft 44 having a dimension $D_2$. Dimension $D_2$ is selected to accommodate (without contact) any distortion or flexure of inner drive shaft 36 which would occur for a predetermined amount of unbalance. It is this intended degree of flexibility of shaft 36 which permits the atomizer disc 28 to rotate under a condition of unbalance about its center of mass, rather than its geometric center, such that no deleterious or destructive vibrational forces are transmitted through the drive shaft assembly and drive means.

Outer shaft 44 is retained in position by bearing means 48, bearing carrier member 50 and housing 26. As depicted, bearing means 48 comprises a pair of axially spaced-apart ball bearing assemblies. Each of bearing means 48 comprises an inner race 54 having a substantially cylindrical inner surface in contact with an outer surface of outer shaft 44. An opposite surface of inner race 54 is surrounded by a plurality of spherical balls 56 which are retained in position by an outer race member 58. The purpose of bearing means 48 is, of course, to permit free rotation of outer shaft 44 while simultaneously permitting it to be restrained from any substantial axial movement. Thus, bearing means 48 is restrained from axial movement by bearing carrier member 50 which circumferentially surrounds each of bearing means 48 and extends coaxially with both shafts 44 and 36. Bearing carrier member 50 is retained in position by an inner surface 60 of housing 26. Inner surface 60 is substantially cylindrical in shape and circumferentially surrounds the bearing carrier member and extends substantially coaxially with both of shafts 36 and 44, and bearing carrier member 50. Bearing carrier member 50 is retained in position at its upper end 62 and lower end 64 by housing 26, in a spaced-apart relationship from inner surface 60. As previously described, the lower portion of bearing carrier member 50 has a plurality of axially extending cantilever spring members 52 which resiliently inhibit movement of bearing carrier member 50 from its coaxial position with outer shaft 44.

It will be seen that there is provided an oil inlet 66 which is in fluid communication with an annular groove 68 which extends about the periphery of surface 60 forming an annular fluid flow passageway. Groove 68 is bounded axially on either side by axially extending annular barriers 70. Barriers 70 limit the maximum amount of lateral displacement of bearing carrier member 50 to a distance of $D_1$. The distance $D_1$ will generally be quite small; generally less than about 0.010 inch and typically about 0.007 inch.

The purpose of annular groove 68 and barriers 70 is to form a squeeze film dampener. Specifically, during operation, a viscous fluid, typically an oil having a viscosity index at least equivalent to an SAE 10 grade oil, is introduced through inlet 66 where it flows through the annular passageway formed by annular groove 68 and axially over barriers 70. If desired, that same fluid may be used as a source of lubrication for bearing means 48, for example, by providing a lubricant passageway 72 in bearing carrier member 50 such that the fluid flowing over barriers 70 will pass through passageway 72 and provide a source of lubricant for the bearing means. The precise manner in which the viscous fluid is provided to annular groove 68 and lubrication to bearing means 48 is a matter of design choice and well within the skills of those versed in the art. Obviously, the fluid could be provided on a once-through basis, though economics will usually dictate that there be provided means for recirculating the fluid. However, this too is well within the skill of the artisan. The purpose of the squeeze film dampener is of course to oppose the motion of the bearing carrier member 50 during transition of the critical speed as well as during normal operation.

The following theory of operation of the drive shaft assembly of the present invention is offered to aid in an understanding of the interrelationship and function of the various parts and also as an aid in adapting the invention to any particular application.

THEORY

The drive shaft assembly shown in FIG. 4 is basically a spring/mass/damper system. There are basically two springs, two masses and two dampers. For the two springs, one is located between the inner and outer shafts while the other is located between the bearing carrier and the bearing carrier housing. The two masses are represented by the unbalanced wheel and bearings, respectively. For the two dampers, one is an oil viscous damper described in FIG. 4 as the "squeeze film," and the second is a viscous dampening effect between the rotating shaft/wheel and the surrounding air.

Figure 5:
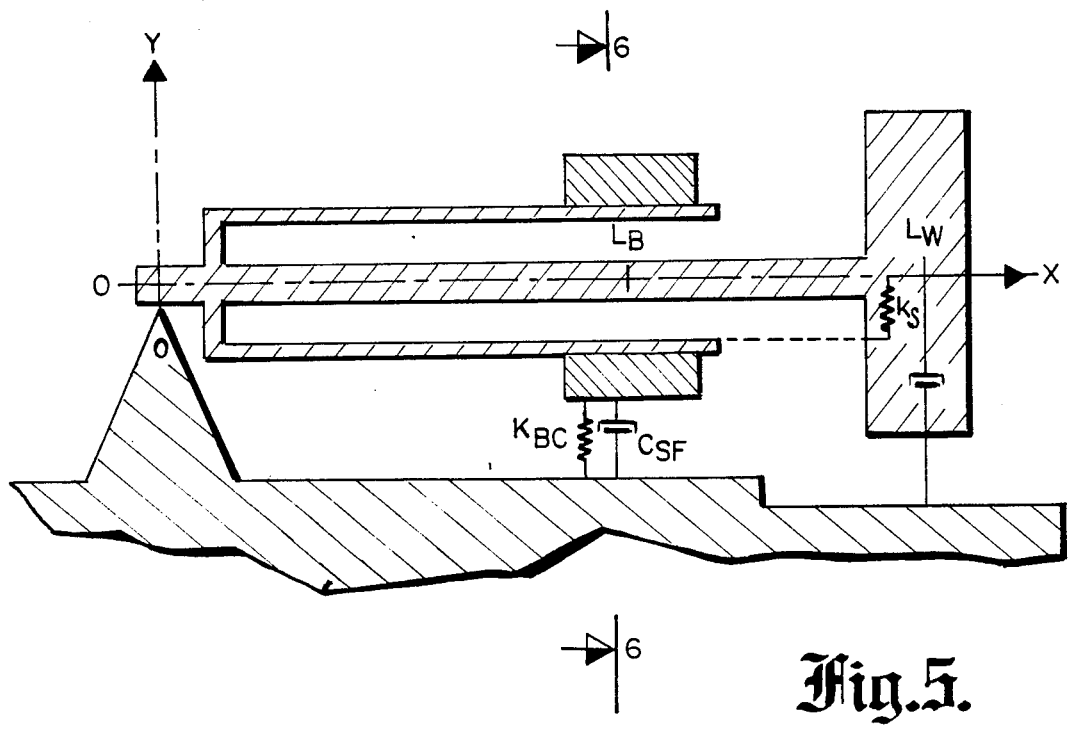
FIG. 5 is a schematic illustration of the spring-dampener utilized in the present invention.
Figure 6:
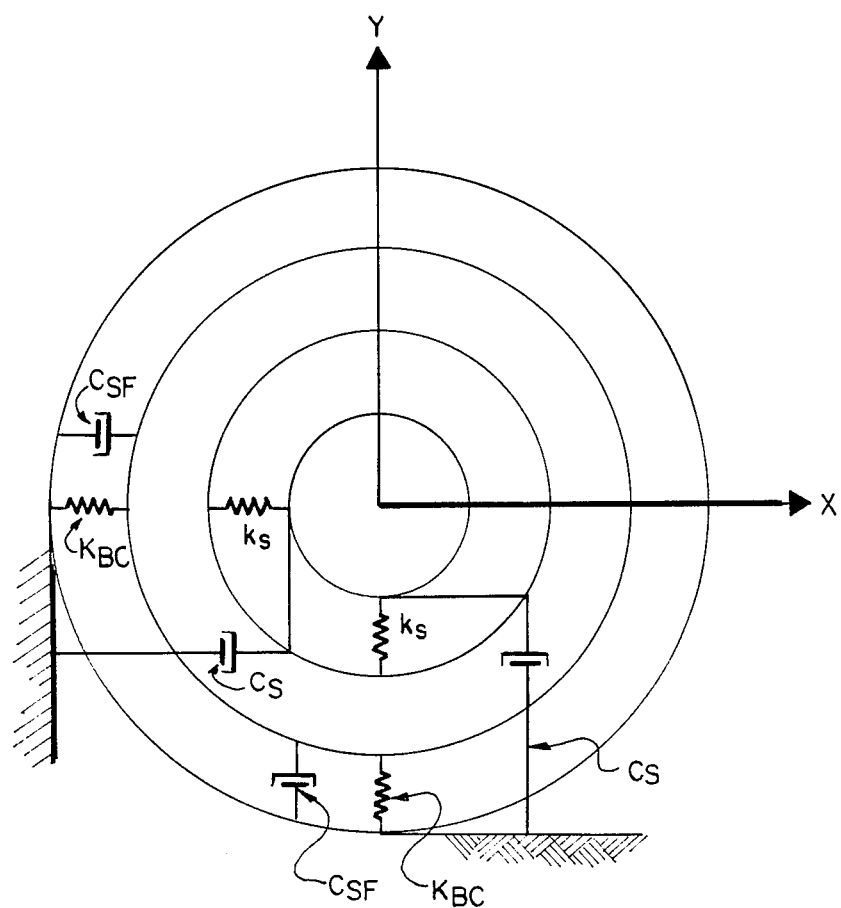
FIG. 6 is a sectional view of FIG. 5 taken along lines 6—6 in the direction of the arrows.
Figure 3:
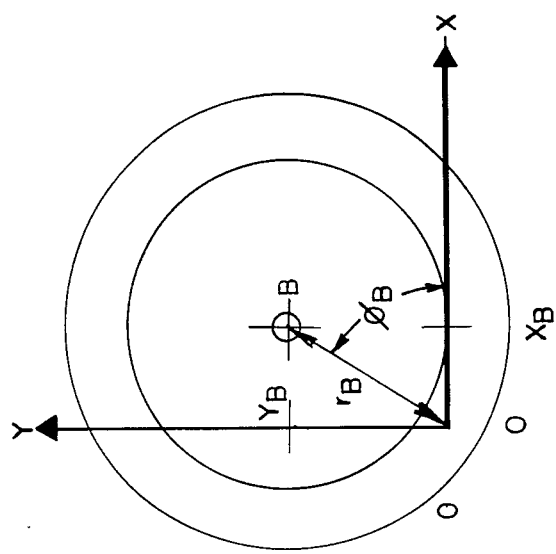
Figure 2:
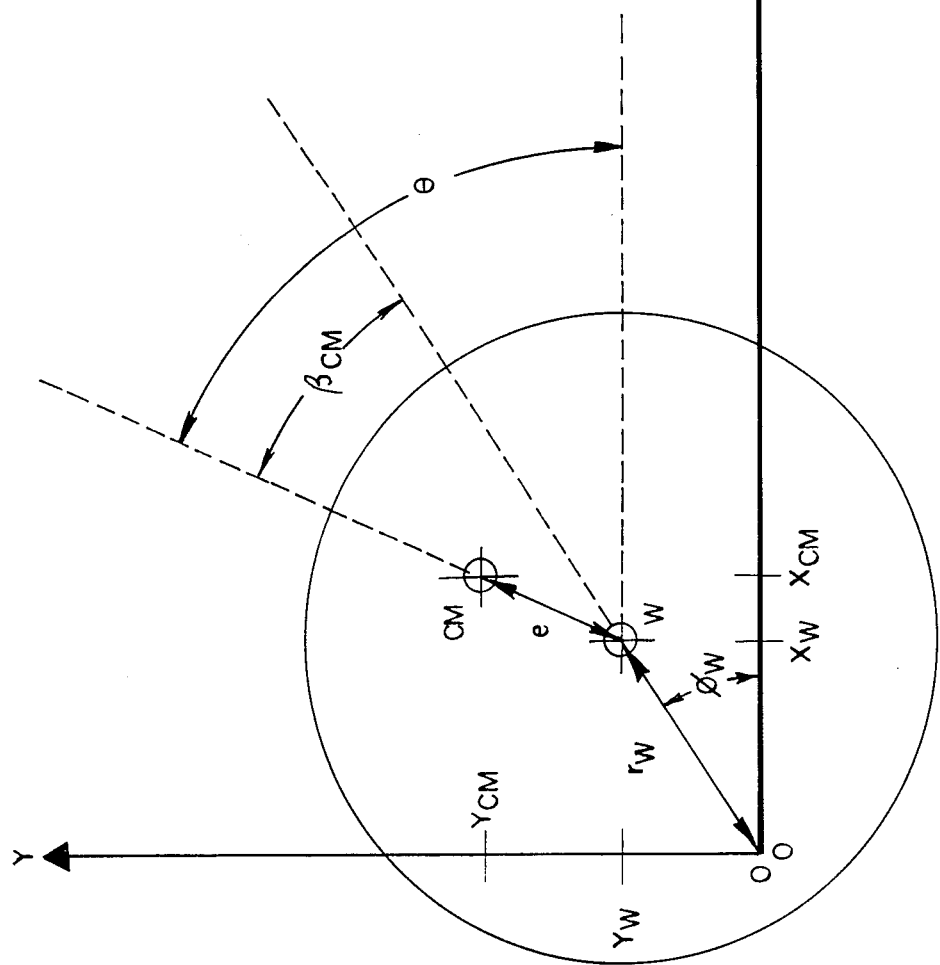

Schematically, the drive shaft assembly of the present invention is shown in FIGS. 5 and 6. FIG. 5 shows a lengthwise view of the assembly with its connecting springs and dampers. The drive shaft is connected at one end to either the output shaft of a motor or gear box. This connection is made, for example, by a spline assembly which allows the shaft to pivot at that connection without putting any bending moments into the shaft. In FIG. 5 the spline location is shown as a simple knife edge support. At the bearing location, $L_B$, the bearing carrier spring $K_{BC}$, and the film damper $C_{SF}$, are shown. At the wheel location, $L_W$, the shaft spring $K_S$ is attached between the wheel and the bearing, and the viscous wheel/shaft damper $C_S$ between the wheel and the air. FIG. 6 is a cross-sectional view of the flex shaft assembly on the section line 6—6 at the bearing location, $L_B$.

In the derivations to follow two assumptions are made. They are: (A) the shaft and the bearing carrier are massless and (B) movement of the bearings and wheel are plane motions only.

Assumption A is valid when the wheel mass and bearing mass are significantly greater than the shaft mass and the bearing carrier mass. Assumption B is true when the bearing and wheel deflections normal to the z-axis (see FIG. 5) are small. Should the wheel be operated under conditions that assumption B is not true then the motion becomes relative and gyroscopic terms must be included in the analysis.

GENERAL EQUATIONS OF MOTION

The Cartesian Coordinate System

The geometry for an unbalanced wheel and bearing are shown in FIGS. 7 and 8. In FIG. 6, the points "W" and "C" denote the wheel's geometric center and the wheel's center of mass, respectively. The distance "$r_w$" and "e" denote the distance the wheel's geometric center is deflected from the origin of the x-y coordinate system and the wheel's eccentricity, respectively.

Using Newton's second law for the x-direction of the unbalanced wheel whereby the wheel's mass times acceleration equals the sum of the forces acting on the wheel the following equation is obtained:

$$m_W \ddot{x}_{CM} = F_{h,x} - k_s \left( x_W - \frac{L_W x_B}{L_B} \right) - c_s \dot{x}_W$$

where
 $m_W$ = mass of the unbalanced wheel, (g)
 $x_{CM}$ = the wheel's center of mass location in the x-direction, (cm)
 $x_W$ = the wheel's geometric center in the x-direction, (cm)

$x_B$ = the bearing's geometry center in the x-direction, (cm)

$F_{h,x}$ = hydraulic forces exerted on the wheel in the x-direction, (dynes)

$c_s$ = shaft/wheel viscous damping coefficient, (dynes.s/cm)

$k_s$ = shaft spring rate, (dynes/cm)

$L_W$ = wheel's axial location from the spline,(cm)

$L_B$ = bearing's axial location from the spline,(cm)

In Equation 1 and all equations to follow, the single dot superscript denotes the first derivative of that variable with time while a double dot superscript denotes the second derivative of that variable with time. The second term on the right-hand side of Equation 1 denotes the force exerted on the unbalanced wheel by the shaft. In order to accurately determine that force in the x-direction, both the wheel's position and bearing's position must be known.

From FIG. 7, the following two geometric relations can be written:

$$x_{CM} = x_W + e \cos \theta \qquad (2)$$

and $$\theta = \theta_0 + \int_0^t \omega \, dt \qquad (3)$$

where e = wheel mass eccentricity, (cm)

$\theta$ = the angle a line through the points "W" and "CM" makes with the x-axis (rad)

$\theta_0$ = the angle $\theta$ at time zero, (rad)

$\omega$ = the wheel/shaft rotational speed, (rad/s)

t = time, (s)

Combining Equations 1-3 yields for the x-direction:

$$m_W \ddot{x}_W + c_s \dot{x}_W + k_s x_W = F_{h,x} + \frac{k_s L_W}{L_B} x_B + \qquad (4)$$

$$m_W e(\omega^2 \cos\theta + \dot{\omega}\sin\theta)$$

Following the same methodology for the y-direction the following equation is obtained:

$$m_W \ddot{y}_W + c_s \dot{y}_W + k_s y_W = F_{h,y} + \frac{k_s L_W}{L_B} y_B + \qquad (5)$$

$$m_W e(\omega^2 \sin\theta - \dot{\omega}\cos\theta)$$

where $F_{h,y}$ = hydraulic forces exerted ont he wheel in the y-direction (dynes)

$y_W$ = the wheel's geometric center in the y-direction, (cm)

$y_B$ = the bearing's geometric center in the y-direction, (cm)

The equations of motion for the bearing mass in the x and y directions are taken from FIG. 8. For the bearings, it is assumed that they are well balanced so that the geometric center of the bearing is at the same location as its center of mass. Thus, the bearing mass equation of motion in the x-direction is:

$$m_B \ddot{x}_B + c_{SF} \dot{x}_B + \left[ k_{BC} + \left( \frac{L_W}{L_B} \right)^2 k_s \right] x_B = \frac{k_s L_W}{L_B} x_W \qquad (6)$$

where $m_B$ = mass of the bearing, (g)

$c_{SF}$ = squeeze film viscous damping coefficient, (dynes.s/cm)

$k_{BC}$ = bearing carrier spring rate, (dynes/cm) Once again one can show for the y-direction that:

$$m_B \ddot{y}_B + c_{SF} \dot{y}_B + \left[ k_{BC} + \left( \frac{L_W}{L_B} \right)^2 k_s \right] y_B = \frac{k_s L_W}{L_B} y_W \qquad (7)$$

Equations 3- provide a system offive equations with five unknowns. The six knowns are: $x_W$, $y_W$, $x_B$, $y_B$, and $\theta$. Therefore, given the spring/mass/damper parameters of this system, both the bearing and the wheel positions can be determined once the wheel/shaft rotational speed, $\omega$, is known as a function of time. This system of equations is known as a five degree of freedom analysis because the wheel and bearings are allowed to move in either the x-direction or y-direction and their motion can vary with time.

The Cylindrical Coordinate System

Using standard coordinate system transformations, Equations 4 and 5 for the unbalanced wheel can be rewritten for the radial and tangential directions. For the radial direction, the equation of wheel motion is:

$$m_W(\ddot{r}_W - r_W \dot{\phi}_W^2) + c_s \dot{r}_W + k_s r_W = F_{h,r} + \frac{k_s L_W \cos\beta_{WB}}{L_B} r_B + \qquad (8)$$

$$m_W e(\omega^2 \cos\beta_{CM} + \dot{\omega}\sin\beta_{CM})$$

where $r_W$ = radial position of the wheel's geometric center, (cm)

$\phi_W$ = the angle a line through the origin and point "W" makes with the x-axis (rad), see FIG. 7

$r_B$ = radial position of the bearing's geometric center, (cm)

$F_{h,r}$ = hydraulic forces exerted on the wheel in the radial direction, (dynes)

$\beta_{WB}$ = phase angle between the wheel and bearing deflections, (rad)

$\beta_{CM}$ = phase angle between the wheel's center of mass and the wheel's geometric center, (rad).

In Equation 8 the two phase angles are given by:

$$\beta_{WB} = \phi_w - \phi_b \qquad (9)$$

and $$\beta_{CM} = \theta - \phi_w \qquad (10)$$

where $\phi_B$ = The angle a line through the origin and point "B" makes with the x-axis (rad), See FIG. 8.

Now for the tangential direction the equation of wheel motion is:

$$m_W(r_W\ddot{\phi}_W + 2\dot{r}_W\dot{\phi}_W) + c_s r_W\dot{\phi}_W = F_{h,\phi} - \frac{k_s L_W \sin\beta_{WB}}{L_B} r_B + \quad (11)$$

$$m_W e(\omega^2 \sin\beta_{CM} - \dot{\omega}\cos\beta_{CM})$$

where $F_{h,\phi}$ = hydraulic forces exerted on the wheel in the tangential direction, (dynes)

Transforming the Cartesian equations of motion for the bearing mass (Equations 6–7) into the cylindrical coordinate system, the equation for radial direction of motion is:

$$m_B(\ddot{r}_B - r_B\dot{\phi}_B^2) + C_{SF}\dot{r}_B + \left[k_{BC} + \left(\frac{L_W}{L_B}\right)^2 k_s\right] r_B = \quad (12)$$

$$\frac{k_s L_W \cos\beta_{WB}}{L_B} r_W$$

and for the cylindrical direction:

$$m_B(r_B\ddot{\phi}_B + 2\dot{r}_B\dot{\phi}_B) + C_{SF} r_B\dot{\phi}_B = \frac{k_s L_W \sin\beta_{WB}}{L_B} r_W \quad (13)$$

Now for cylindrical coordinates, Equations 8–13 together with Equation 3 provide a system of seven equations with seven unknowns. The eight unknowns are: $r_W$, $r_B$, $\phi_W$, $\phi_B$, $\beta_{WB}$, $\beta_{CM}$, and $\theta$. Therefore, given the spring/mass/damper parameters of this system, both the wheel and bearing positions can be determined once the wheel/shaft rotational speed, $\omega$, is known as a function of time.

The term $r\dot{\phi}^2$ found in Equations 8 and 12 is the well known centrifugal acceleration. The term $2\dot{r}\dot{\phi}$ found in Equations 11 and 13 is the well known Coriolis acceleration.

Like the Cartesian system of equations, the above equations for cylindrical coordinates also constitute a five degree of freedom system.

SYNCHRONOUS MOTION

It has been found that for many rotating machinery applications that the orbits of the various system masses are synchronous with the wheel/shaft rotational speed. For the system of FIG. 4, synchronous motion is mathematically defined when:

$$\dot{\phi}_W = \dot{\phi}_B = \omega \quad (14)$$

Unsteady Synchronous Motion

Using Equation 14, Equations 8 and 11—13 provide a system of four equations with four unknowns to solve for the unsteady synchronous motion case. The four unknowns are: $r_W$, $r_B$, $\beta_{WB}$, and $\beta_{CM}$. Therefore, once the wheel/shaft rotational speed, $\omega$, is given as a function of time, the equations of motion for the unsteady synchronous motion system can be integrated over time.

This system of equations is known as a three degree of freedom system. This is because the wheel and bearing are allowed to vary only in the radial direction with time.

Steady-State Synchronous Motion

A steady-state solution to the general equations of motion requires that:

$$\ddot{r}_W = \dot{r}_W = \ddot{r}_B = \ddot{\phi}_W = \ddot{\phi}_B = \dot{\omega} = 0 \quad (15)$$

Using Equations 14 and 15 for steady-state synchronous motion, Equations 8 and 11–13 can be rewritten as:

$$a_1 r_W = a_2 r_B \cos\beta_{WB} + a_3 \cos\beta_{CM} \quad (16)$$

$$a_4 r_W = -a_2 r_B \sin\beta_{WB} + a_3 \sin\beta_{CM} \quad (17)$$

$$a_5 r_B = a_2 r_W \cos\beta_{WB} \quad (18)$$

and $$a_6 r_B = a_2 r_W \sin\beta_{WB} \quad (19)$$

The constants $a_1$, $a_2$, $a_3$, $a_4$, $a_5$, and $a_6$ are given by:

$$a_1 = k_s - m_W\omega^2 \quad (20)$$

$$a_2 = \frac{k_s L_W}{L_B} \quad (21)$$

$$a_3 = m_W e\omega^2 \quad (22)$$

$$a_4 = c_s\omega \quad (23)$$

$$a_5 = k_{BC} + \left(\frac{L_W}{L_B}\right)^2 k_s - m_B\omega^2 \quad (24)$$

$$a_6 = c_{SF}\omega \quad (25)$$

In developing Equations 16–19 the hydraulic forces, $F_{h,r}$ and $F_{h,\phi}$, are set equal to zero in Equations 8 and 11. For unbalanced wheels feeding liquids through them for spray dryer applications, usually the liquid is being uniformly fed so that these hydraulic forces are indeed zero.

Equations 16–19 provide a system of four linear algebraic equations with four unknowns which can be readily solved for $r_W$, $r_B$, $\beta_{WB}$, and $\beta_{CM}$. These equations can be solved to show that:

$$r_W = \frac{a_3\sqrt{a_5^2 + a_6^2}}{\sqrt{(a_1 a_5 - a_4 a_6 - a_2^2)^2 + (a_1 a_6 + a_4 a_5)^2}} \quad (26)$$

$$r_B = \frac{a_2}{\sqrt{a_5^2 + a_6^2}} r_W \quad (27)$$

$$\tan\beta_{WB} = \frac{a_6}{a_5} \quad (28)$$

$$\tan\beta_{CM} = \frac{[a_4(a_5^2 + a_6^2) + a_2^2 a_6]}{[a_1(a_5^2 + a_6^2) - a_2^2 a_5]} \quad (29)$$

It is desirable to determine the radial deflection critical speeds of the rotating machinery. These critical speeds are defined as those speeds at which the radial deflections approach infinity when the system is undamped. For the shaft of FIG. 4, these critical speeds can be found by setting the denominator of Equation 28 equal to zero and solving for the wheel/shaft speed, $\omega$, after also setting the viscous damping coefficients, $c_s$ and $c_{SF}$, equal to zero as well. Performing these operations will show that the undamped radial critical speeds are given by:

$$\omega_{CR}^2 = \frac{b_{cr} \pm \sqrt{b_{cr}^2 - 4c_{cr}}}{2} \quad (30)$$

Where the quadratic constants are:

$$b_{CR} = \frac{k_s}{m_W} + \frac{k_{BC}}{m_B} + \left(\frac{L_W}{L_B}\right)^2 \frac{k_s}{m_B} \quad (31)$$

$$c_{cr} = \frac{k_{BC}k_s}{m_B m_W} \quad (32)$$

and $\omega_{cr}$=undamped radial critical speed, (rad/s)

It is to be noted that Equation 30 shows that the shaft will contain two critical speeds. Also, Equations 16–19 are known as a two degree of freedom system since the wheel and bearing mass are now allowed to move only in the radial direction.

EXAMPLE

A drive shaft assembly substantially as hereinbefore described was constructed for operation with a high-speed, 400-hp motor. Spring means 46 had a spring constant of 6,100 lb/inch. Distance $D_2$ was 0.040 inch. Spring members 52 had a spring constant of 19,000 lb/inch and the distance $D_1$ was 0.0075 inch. Barriers 70 had a radius of 2.066 inches and a combined axial length of 1.400 inches. The distance from the spline to disc 28 ($L_W$) was 18 inches and the distance from the spline to spring members 52 ($L_B$) was 11.7 inches. The final assembly had a first undamped critical speed of approximately 2,000 rpm and a second undamped critical speed of approximately 9,000 rpm. The disc had a nominal mass of 25 lbs and was operated at 14,000 rpm with about a 4.0 ounce-inch of unbalance for over 1100 hours without damage. Further, the shaft assembly successfully traversed both critical speeds with this degree of unbalance without detrimental effect. Since previous shaft assemblies had failed under similar conditions with a much lesser amount of unbalance, this demonstrated the efficacy of the present invention.

While the present invention has been described and what is presently considered its best mode and application illustrated, it will be appreciated that many modifications and variations will be evident in light of the foregoing teachings. Thus, the drive shaft assembly may be utilized in different applications such as turbines, etc. Other bearings may be utilized as well as modifications of the arrangement of the individual parts. It is, therefore, to be understood that within the scope of the appended claims, the invention may be practiced otherwise than as particularly described.

What is claimed is:

1. In a machine including a drive means for imparting torque at a high rotational speed to a drive assembly for transmitting siad torque to a work piece which is subjected to variable imbalance conditions during normal operation of the machine, the improvement in the drive shaft assembly to accommodate such imbalance conditions comprising:
    an elongated inner dirve shaft having opposite ends, one of said ends being provided with engagement means engaged with said drive means for receiving the torque therefrom and the opposite end being cooperatively engaged with said work piece for transmitting the torque thereto;
    a substantially cylindrical, hollow, outer shaft circumferentially surrounding said drive shaft and coaxial therewith, said outer shaft having an inner surface spaced apart from an outer surface of said drive shaft and said outer shaft being connected to said drive shaft;
    first spring means for resiliently inhibiting movement of said outer shaft out of its coaxial position with said drive shaft;
    a bearing carrier member circumferentially surrounding and extending coaxially with said outer shaft;
    bearing means located circumferentially about an outer surface of said outer shaft for permitting rotational movement of said outer shaft, said bearing means being retained in position by an inner surface of said bearing carrier member and the outer surface of said outer shaft;
    lubrication means for providing a flow of lubricant to said bearing means;
    second spring means for resiliently inhibiting movement of said bearing carrier member from its coaxial position with said outer shaft;
    a support structure supporting said drive menas, said support structure including a bore defined by an inner surface circumferentially surrounding said barrier carrier member and second spring means, the bore extending substantially coaxially with both of said shafts and said bearing carrier member, the outer surface of said bearing carrier member and inner surface of the bore cooperatively forming an annular fluid flow passageway, said annular fluid flow passageway being bounded on either side annular, axially extending barriers, each barrier forming a restricted fluid flow path; and
    means for providing a pressurized flow of a viscous fluid to said annular fluid flow passageway during normal operation of the machine such that said fluid will flow axially across each barrier forming a squeeze film damper to resist lateral movement of said bearing carrier member.

2. The machine of claim 1 wherein said inner drive shaft is hollow throughout a substantial portion of its length.

3. The machine of claim 1 wherein said engagement means provides for pivotal motion whereby minimal bending moments are transferred between said drive means and said drive shaft.

4. The machine of claim 3 wherein said pivotal motion is provided by male and female spline members, one of said members being connected to said drive shaft and the other of said members being connected to said drive means.

5. The machine of claim 1 wherein said first spring means is located intermediate the inner surface of said outer shaft and the outer surface of said drive shaft.

6. The machine of claim 5 wherein said first spring means comprises a plurality of axially extending elements each of said elements forming a cantilever spring.

7. The machine of claim 6 wherein said bearing means comprises a pair of axially spaced-apart ball bearing assemblies, each of said ball bearing assemblies comprising a plurality of spherical ball members retained in place by an inner race member in contact with said outer shaft and an outer race member in contact with said bearing carrier member.

8. The machine of claim 7 wherein said second spring means comprises an integral part of said bearing carrier member and includes a plurality of axial extending elements, each of said elements forming a cantilever spring.

9. The machine of claim 8 wherein said engagement means provides for pivotal motion whereby minimal bending moments are transferred between said drive means and said drive shaft.

10. The machine of claim 9 wherein said pivotal motion is provided by male and female spline members, one of said members being attached to said drive shaft and the other of said members being attached to said drive means.

11. The machine of claim 10 wherein said inner drive shaft is hollow throughout a substantial portion of its length.

12. The machine of claim 11 wherein said outer shaft is connected to said drive shaft adjacent said drive means.

13. The machine of claim 12 wherein said work piece comprises an atomizer disc for producing a dispersed spray of a liquid.

14. The machine of claim 13 further including a spray drying chamber provided with means for the introduction of a hot gas and in which said atomizer disc is disposed.

15. The machine of claim 12 wherein said drive shaft assembly has two critical speeds and said machine is designed to operate at a speed substantially in excess of both of said critical speeds.

16. The machine of claim 12 wherein said drive shaft assembly has two critical speeds and said machine is designed to operate at a speed between these two critical speeds.

17. The machine of claim 1 wherein said bearing means comprises a pair of axially spaced-apart ball bearing assemblies, each of said ball bearing assemblies comprising a plurality of spherical ball members retained in place by an inner race member in contact with said outer shaft and an outer race member in contact with said bearing carrier member.

18. The machine of claim 1 wherein said second spring means comprises an integral part of said bearing carrier member and includes a plurality of axial extending elements, each of said elements forming a cantilever spring.

19. The machine of claim 1 wherein said work piece comprises an atomizer disc for producing a dispersed spray of a slurry.

20. The machine of claim 1 wherein said outer shaft is connected to said drive shaft adjacent said drive means.

21. The machine of claim 1 wherein said drive shaft assembly has two critical speeds and said machine is designed to operate at a speed substantially in excess of both of said critical speeds.

22. The machine of claim 1 further including a spray drying chamber provided with means for the introduction of a hot gas and wherein said work piece comprises an atomizer disc located within said spray drying chamber for produc